Patented Oct. 19, 1943

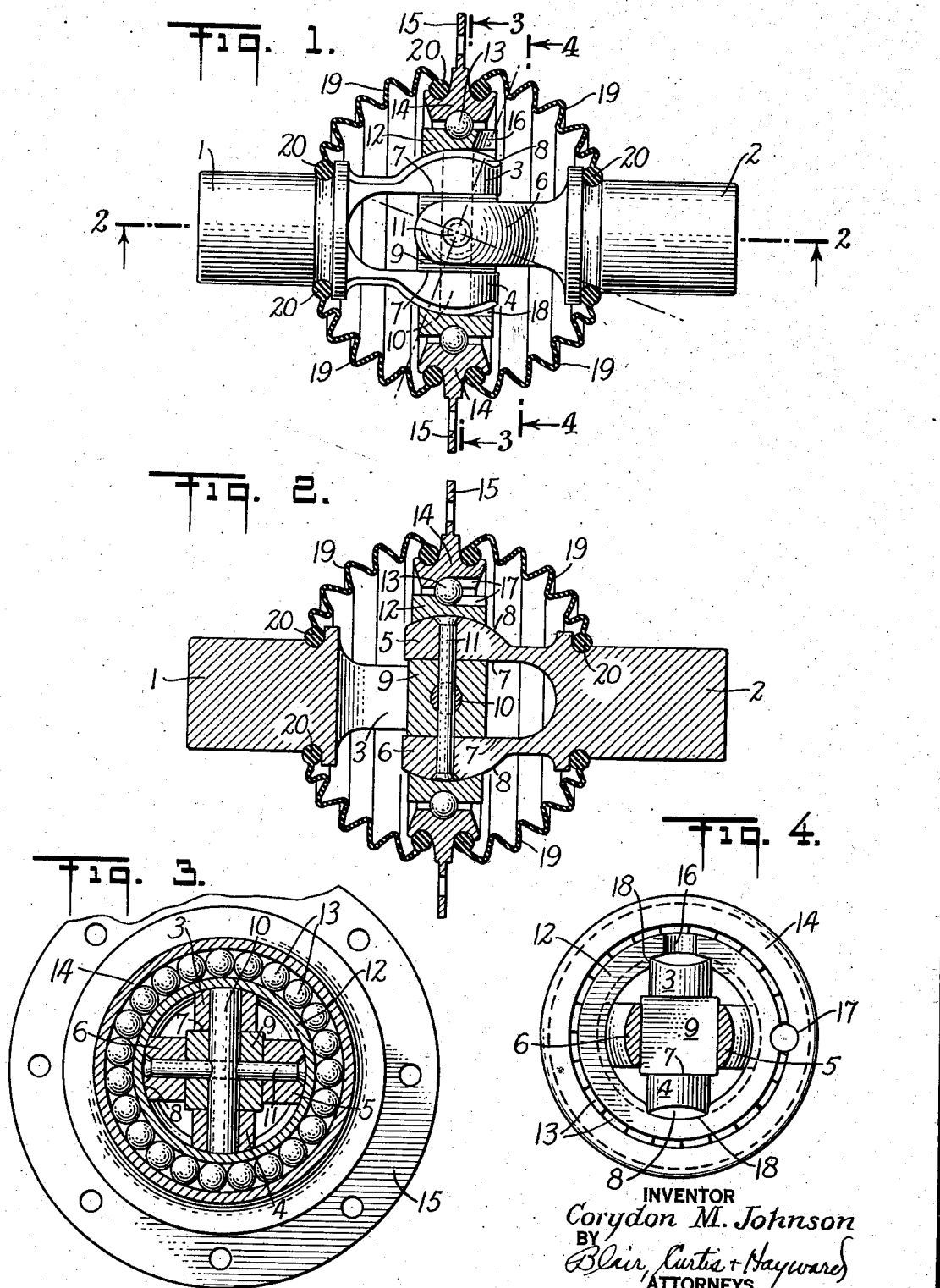

2,331,982

UNITED STATES PATENT OFFICE 2,331,982

COMBINED UNIVERSAL JOINT AND BEARING

Corydon M. Johnson, Freeport, N. Y.

Application March 26, 1942, Serial No. 436,238

7 Claims. (Cl. 64—17)

This invention relates to a combined universal joint and bearing for an articulated shaft assembly.

An object of the invention resides in a device of this character wherein the parts may be easily assembled and because of their relationship will be subjected to the minimum wear.

Other objects of the invention will appear as the description progresses.

In the drawing:

Figure 1 is a sectional view of the assembly;

Figure 2 is a section at right angles to Figure 1;

Figure 3 is a section on line 3—3 of Figure 1; and

Figure 4 is a section on line 4—4 of Figure 1.

The form of the invention illustrated in the drawing includes articulated shaft sections 1 and 2. The end of each section is bifurcated forming forked bearing elements 3, 4, 5 and 6 and having inside faces 7 and outside faces 8 which latter are formed on spherical curves. Between the faces 7 a block 9 is located. The forked bearing members 3 and 4 and the block 9 are provided with aligned openings through which a substantially cylindrical pin 10 passes to secure the elements 3, 4 and the block 9 together but to permit the relative axial rotation of the block in respect of the bearing elements 3 and 4.

The block and the bearing elements 5 and 6, as well as the pin 10, are provided with substantially cylindrical aligned openings through which a pin 11 passes to secure the bearing elements 5 and 6 and the block 9 together. Thus by means of the pins 10 and 11 the bearing elements 3, 4, 5 and 6 are secured to the block 9 and may have movement with or in relation to the block. That is to say one of the articulated shaft members 1 or 2 may swing on its pin 10 or 11 as a pivot and thus in relation to the block 9 while the other swings with the block. In this way a substantially universal movement is obtainable. A bearing member 12 is provided, the inner face of this bearing member being formed on a spherical curve so as to receive and act as a bearing for the outer faces of the elements 3, 4, 5 and 6.

This bearing member 12 is formed of a single piece of material and is supported on ball bearings 13 which also have bearing surfaces in a seat in the ring 14. This ring is adapted, by means of projections 15, to be secured to a stationary part to support the entire assembly. Thus the elements 3, 4, 5 and 6 may move on their pivots 10 and 11 respectively and independently and as a unit may move with the bearing member 12 on the ball bearings 13.

In order to assemble the device the bearing member 12 is provided with a notch 16 and the bearing member 12 together with the ring 14 are provided with complemental openings 17 for the reception of the ball bearings.

The bearing member 12 is also provided with notches 18.

In assembling the device the shaft section 1 is first inserted through the bearing member 12 with the bearing elements 3 and 4 in alignment with the notches 18. This permits the assembly of the complemental spherical curves of the outer faces of the elements 3 and 4 and the inner face of the member 12. Of course prior to this assembly the pin 10 and the block 9 may be assembled in the forked end of the shaft section 1.

The shaft section is then rotated ninety degrees and swung into the position shown in construction lines in Figure 1.

The forked end of the shaft section 2 is then slipped over the block, again using the notches 18 and the pin 11 dropped into the aligned openings in the bearing elements 5 and 6 and the block 9. One end of this pin is headed so that as the pin is dropped into position the two shafts must be swung one hundred and eighty degrees maintaining, however, their same angular relationship to each other. This swinging will expose the unheaded end of the pin 11 at the notch 16 so that that end may be headed as for instance by spinning.

Thus the assembly may take place and after assembly the forked ends of the shaft sections will be held in the bearing member 12 against longitudinal displacement but will, with this bearing member 12, be free to accomplish universal movement.

A seal 19 may be used, which seal is of an accordion form and may be secured by rubber rings 20 to the shaft sections and to the link 14, to prevent access of dirt, water and other foreign material to the universal joint.

I claim:

1. A combined universal joint and bearing including shaft sections having forked ends the outer faces of which are spherically curved, a block disposed between said forked ends, pins extending through the forked ends and block on which the forked ends are pivoted, a one piece bearing member surrounding the forked ends and having an inner spherically curved face cooperating with the spherically curved faces of the forked ends to form a bearing therefor, a ring surrounding the bearing member, and anti-friction bearings disposed between the ring and the bearing member.

2. A combined universal joint and bearing including shaft sections having forked ends the outer faces of which are spherically curved, a block disposed between said forked ends, a pin loosely extending through the forked ends of one shaft section and through the block, a pin extending through the forked ends of the other shaft section, through the block and through the first mentioned pin and secured in said forked ends, a one piece bearing member surrounding the forked ends having an inner spherically curved face cooperating with the spherically curved face of the forked ends to form a bearing therefor and in alignment with the bearing of the pins, and means supporting the bearing member.

3. A combined universal joint and bearing including shaft sections having forked ends, a block disposed between said forked ends, pins extending through the forked ends and block on which the forked ends are pivoted, a one piece bearing member surrounding the forked ends and having a face cooperating with the outer faces of the forked ends to form a bearing therefor, and means for supporting the bearing member.

4. A combined universal joint and bearing including shaft sections having forked ends the outer faces of which are spherically curved, a block disposed between said forked ends, pins extending through the forked ends and block on which the forked ends are pivoted, a one piece bearing member surrounding the forked ends and having an inner spherically curved face cooperating with the spherically curved faces of the forked ends to form a bearing therefor, said bearing member having notches at one side for the reception of the forked ends in assembling the forked ends and the bearing member, and means for supporting the bearing member 5. A combined universal joint and bearing including shaft sections having forked ends the outer faces of which are spherically curved, a block disposed between said forked ends, pins extending through the forked ends and block on which the forked ends are pivoted, a one piece bearing member surrounding the forked ends and having an inner spherically curved face cooperating with the spherically curved faces of the forked ends to form a bearing therefor, a one piece ring surrounding the bearing member, and anti-friction bearings disposed between the ring and the bearing member.

6. A combined universal joint and bearing including shaft sections having forked ends the outer faces of which are spherically curved, a block disposed between said forked ends, pins extending through the forked ends and block on which the forked ends are pivoted, a one piece bearing member surrounding the forked ends and having an inner spherically curved face cooperating with the spherically curved faces of the forked ends to form a bearing therefor, a one piece ring surrounding the bearing member, and anti-friction ball bearings disposed between the ring and the bearing member.

7. A combined universal joint and bearing including shaft sections having forked ends the outer faces of which are spherically curved, a block disposed between said forked ends, pins extending through the forked ends and block on which the forked ends are pivoted, a one piece bearing member surrounding the forked ends and having an inner spherically curved face cooperating with the spherically curved faces of the forked ends to form a bearing therefor, said bearing member having notches at one side for the reception of the forked ends in assembling the forked ends and the bearing member, and means for supporting the bearing member, said last mentioned means including a one piece ring and anti-friction ball bearings disposed between the said bearing member and said ring, said ring and bearing member having cooperating notches in adjacent faces thereof for the reception of the ball bearings in assembling the bearing member, the ring and ball bearings.

CORYDON M. JOHNSON.